Dec. 7, 1965    K. G. KREUTER    3,221,761
PNEUMATIC CONTROLLER

Filed April 3, 1962    2 Sheets-Sheet 1

INVENTOR.
KENNETH G. KREUTER
BY Mead, Browne, Schuyler, & Beveridge
ATTORNEYS.

Dec. 7, 1965   K. G. KREUTER   3,221,761
PNEUMATIC CONTROLLER
Filed April 3, 1962   2 Sheets-Sheet 2

INVENTOR.
KENNETH G. KREUTER
BY
Mead, Browne, Schuyler, & Beveridge
ATTORNEYS.

United States Patent Office 3,221,761
Patented Dec. 7, 1965

3,221,761
PNEUMATIC CONTROLLER
Kenneth G. Kreuter, Goshen, Ind., assignor to Robertshaw Controls Company, Richmond, Va., a corporation of Delaware
Filed Apr. 3, 1962, Ser. No. 184,799
6 Claims. (Cl. 137—82)

This invention relates to pneumatic control apparatus for controlling variable conditions, and is particularly concerned with controllers of the type in which a control pressure is transmitted in response to a variation in the condition being controlled.

In apparatus of this type, the pressure signal is usually transmitted through an adjustable linkage or lever to actuate a valve or some other control element to vary a controlling pressure. The accuracy of such apparatus is therefore limited by the frictional forces of the links and levers.

It is an object of this invention to provide a pneumatic controller in which variations in the condition being controlled is transmitted to a controlling mechanism in a substantially friction free manner.

A further object of this invention is to provide a pneumatic controller having improved range adjustment mechanism.

Another object is to provide a pressure responsive, pneumatic controller of simplified, economic construction in which the sensitivity can be uniformly adjusted over a wide range.

In attainment of the objects of the invention, a flexible diaphragm is suspended in a hollow casing between a pair of opposed, adjustable springs to form a pair of chambers in the casing. Mounted beneath the casing is a housing having a control chamber with supply and delivery ports. Fluid pressure in the control chamber is controlled by an exhaust valve mechanism in the form of a leak port-flapper assembly. Pressure differentials across the diaphragm are transmitted to the flapper valve by a stem which extends through an opening in the casing and which is carried by the diaphragm and a flexible seal which closes the opening. Connecting the chambers in the casing is a passage which is controlled by an adjustable throttling screw. By correlating the adjustment of the springs with the position of the throttling screw, the amount of pressure differential required to move the diaphragm can be varied over a wide range.

Other objects and advantages of the invention will become apparent from the following description taken in connection with the accompanying drawings in which.

Figure 1:
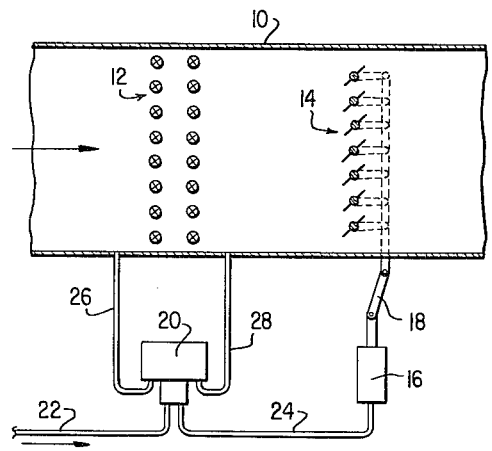
FIG. 1 is a diagrammatic view of a heating system employing a pneumatic controller.
Figure 2:
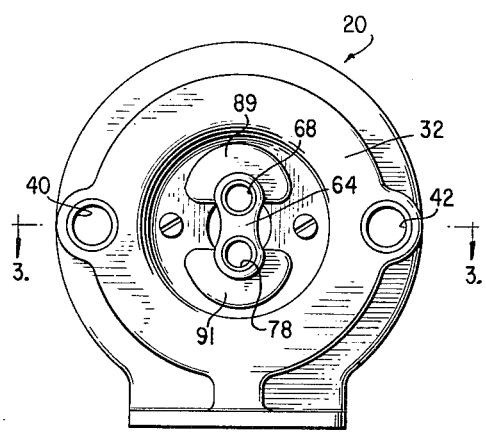
FIG. 2 is a bottom view of a controller embodying a preferred form of the invention.

In FIG. 1, a duct 10 of a heating system is provided with a heating coil 12. Flow through the duct is controlled by a damper 14. In order to maintain a constant rate of delivery of the heated air from the duct to the space being heated, the opening provided by damper 14 is varied in accordance with the volume of air passing through the duct. Damper 14 is controlled by a conventional pneumatic piston actuator 16 connected with the damper by linkage illustrated diagrammatically at 18. Piston actuator 16 is in turn controlled by a pneumatic controller 20 which has a supply port connected with a constant supply of pressure through a pipe 22, and a delivery port connected with piston actuator 16 through a pipe 24. Controller 20 modulates the pressure in delivery pipe 24 in response to variations in the pressure drop across heating coil 12 as sensed by static pressure sensing pipes 26 and 28. Since the static pressure drop across coil 12 is indicative of the rate of flow through the duct, a constant rate of delivery past damper 14 is maintained.

Controller 20 comprises a hollow casing formed by a pair of casing members 30 and 32 joined together with a flexible diaphragm 34 clamped between their peripheral edges to define an upper chamber 36 and a lower chamber 38. Chamber 36 communicates with an inlet passage 40 through an orifice 42, and chamber 38 connects with an inlet passage 44. Filter screens 41 and 43 are mounted respectively in passages 40 and 44 to prevent the entry of foreign matter into the chambers. Chambers 36 and 38 are connected through a passage 46 provided in the casing wall, and the rate of flow through passage 46 is controlled by an adjustable throttling screw 48.

Mounted on opposite sides of diaphragm 34 are a pair of spring plates 50 and 52, and a pair of opposed compression springs 54 and 56 are seated against the opposite sides of diaphragm 34 in plates 50 and 52 respectively. Spring 56 is seated against a shoulder 58 formed in the lower wall of chamber 38, and spring 54 has one end seated against a spring seat member 60 which engages the end of an adjustable set point screw 62 which is threadedly mounted in the upper wall of casing member 30. Diaphragm 34 thus has its central portion suspended between springs 54 and 56 and the position of diaphragm 34 can be adjusted by rotation of set point screw 62. In the system illustrated in FIG. 1, the upstream static pressure is transmitted through pipe 26 to chamber 36 through inlet port 40 and the downstream static pressure is transmitted to chamber 38 from inlet pipe 28 which is connected with inlet port 44. Diaphragm 34 moves from the position determined by set point screw 62 in accordance with the pressure drop across coil 12 as sensed by the static pressure pipes 26 and 28.

Figure 4:
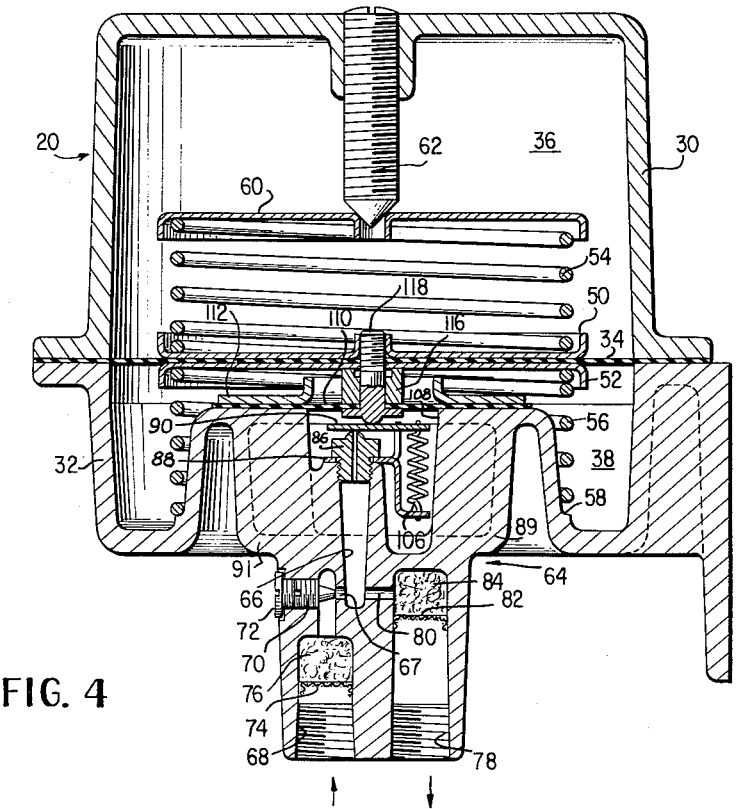
FIG. 4 is a sectional view taken on line 4—4 of FIG. 3.

Formed on the lower wall of casing member 32 is a housing 64 in which is formed a control chamber 66 (FIG. 4). Control chamber 66 communicates through an orifice 67 with a supply port 68 for connection with a constant supply of pressure. Flow from supply port 68 into control chamber 66 is metered by an adjustable needle valve 70 which is threadedly mounted in the wall of housing 64 and cooperates with orifice 67. A screw 72 may be provided in the threaded opening to prevent undesired rotation of needle valve 70. Supply port 68 is provided with a screen 74 and a cotton filter 76 to filter the air supply into control chamber 66. Control chamber 66 communicates with a delivery port 78 formed in housing 64 through a port 80 in the lower wall of control chamber 66, and the flow from chamber 66 to delivery port 78 is filtered through a screen 82 and cotton filter 84.

Figure 3:
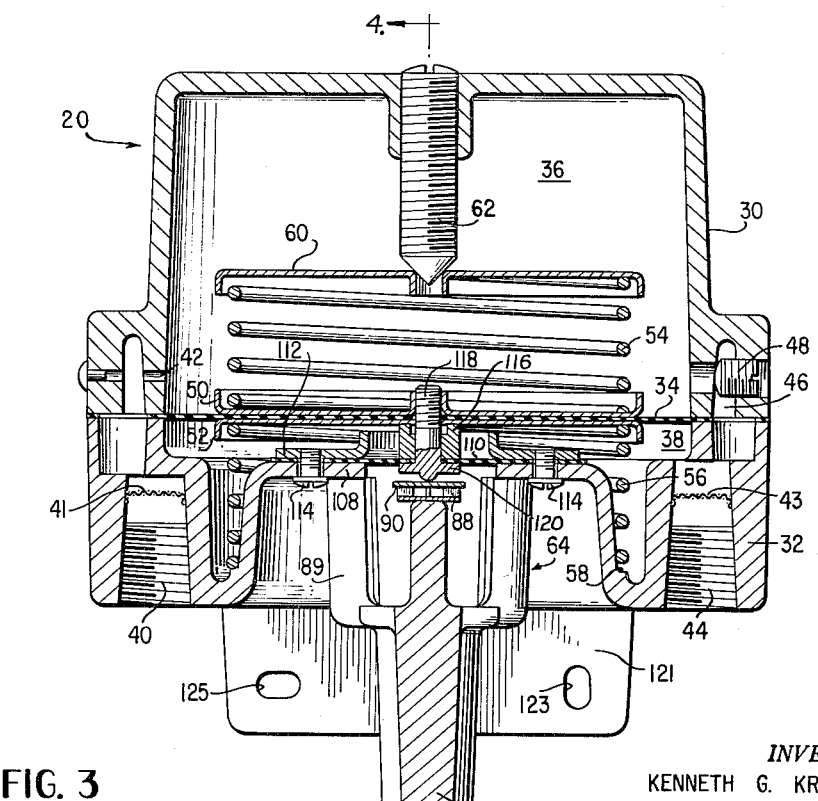
FIG. 3 is a sectional view taken on line 3—3 of FIG. 2.

Control chamber 66 is internally threaded at its upper end for receiving a threaded, flanged leak port fitting 86, and an exhaust valve support bracket 88 is clamped between the flange of leak port fitting 86 and the outer wall of control chamber 66. Housing 64 is open to atmosphere between the upper sections 89 and 91 (FIG. 3) above control chamber 66 and the pressure in control chamber 66 is controlled by varying the rate of flow through leak port 86. For controlling the rate of flow through leak port 86, a flapper type exhaust valve 90 is pivotally mounted on support bracket 88 and is movable relative to leak port 86 to vary the rate of flow from control chamber 66 to atmosphere. When valve 90 is in the position illustrated in FIG. 4 leak port 86 is closed and the pressure in control chamber 66 is at a maximum as determined by the pressure introduced through supply port 68. As flapper valve 90 moves away from leak port 86, the rate of flow through the leak port increases until valve 90 moves to a position so as to have no effect on the leak port, and the pressure in control chamber 66 is reduced to a minimum when the rate of flow through leak port 86 is at a maximum. It is preferred that leak port 86 be substantially larger than the opening controlled by needle valve 70 so that when valve 90 is in its maximum open position away from leak port 86, the pressure in control chamber 66 will be reduced to substantially zero.

Figure 5:
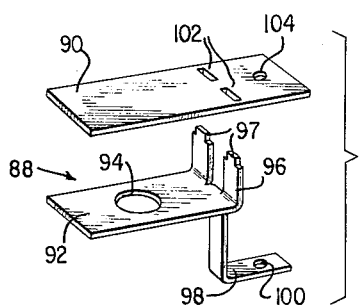
FIG. 5 is an exploded perspective view of the leak-port-flapper assembly employed in the preferred form of the invention.

With reference to FIG. 5, support bracket 88 includes a main body portion 92 having an aperture 94 for receiving leak port fitting 86. Extending upwardly from one end of body portion 92 is a pair of ears 96 having pivot tabs 97 formed at their upper ends. Depending from the same end is a spring support arm 98 having an aperture 100 for engagement with the end of a valve spring. Flapper valve 90 is provided with a pair of pivot notches 102 for receiving pivot tabs 97, and a spring aperture 104 is provided adjacent its end. Mounted in apertures 100 and 104 is a spring 106 which biases valve 90 to its open, or exhaust position.

Chamber 38 is provided with an opening 108 formed in its lower wall, which is closed by a flexible sealing diaphragm 110 mounted in the chamber by a plate 112 which is secured to the casing by screws 114. Mounted between spring plate 52 and sealing diaphragm 110 is a spacer member 116 having a cylindrical opening, and a valve actuating stem 118 extends through openings in the diaphragms and spacer member 116 into threaded engagement with spring plate 50. Flange 120 formed on stem 118 cooperates with spacer member 116 to clamp the central portions of sealing diaphragm 110 and the main diaphragm 34 together. Pressure variations in chambers 36 and 38 causing movement of diaphragm 34 therefore cause stem 118 to actuate valve 90 relative to leak port 86 in accordance with the pressure differential between chambers 36 and 38. Integrally formed with casing member 32 is a mounting bracket 121 having slots 123 and 125 for receiving conventional fasteners for mounting the controller on a support.

In operation, the controller may operate as either a "direct acting" or a "reverse acting" control. As a "direct acting" control, the higher pressure is connected with chamber 36 and increases in the pressure in chamber 36 will cause an increase in the control pressure from delivery port 78. Conversely, as a "reverse acting" control, the higher pressure is connected with chamber 38 and an increase in the pressure in chamber 36 will cause a decrease in the pressure from delivery port 78.

FIG. 1 illustrates the controller connected for direct action and chamber 36 senses the pressure upstream of coil 12 by connecting pipe 26 with inlet passage 40, and pipe 28 is connected with inlet passage 44 to connect chamber 38 with the downstream pressure. Set point screw 62 determines the operating point; i.e., the point at which the pressure differential between chambers 36 and 38 is sufficient to move flapper valve 90 toward the leak port. Adjustment of set point screw 62 determines the amount of travel required of diaphragm 34 to move flapper valve 90 between its extreme positions.

As the pressure drop across coil 12 increases, the pressure in chamber 36 increases causing diaphragm 34 to move flapper valve 90 toward the leak port to increase the pressure in control chamber 66. Piston actuator 16 responds to the increased pressure delivered from control chamber 66 by changing the position of the damper to decrease the rate of flow from the duct.

When passage 46 is completely closed by throttling screw 48, slight increases in pressure in chamber 36 over that in chamber 38 will cause movement of diaphragm 34 providing maximum sensitivity of the controller to pressure changes.

Since this maximum sensitivity to pressure changes may be undesirable in some applications, throttling screw 48 may be adjusted to provide an opening in passage 46 permitting flow between chamber 36 and 38. As the size of the opening is increased, the sensitivity is decreased. With throttling screw 48 adjusted to permit flow between chambers 36 and 38, a pressure drop will occur across orifice 42. Thus, an increase in pressure at inlet passage 40 will result in a somewhat smaller increase in the pressure in chamber 36, depending upon the size of the opening provided by throttling screw 48. Any given position of throttling screw 48 will provide a uniform throttling range for any setting of set point screw 62. With diaphragm 34 suspended between spring 54 and 56, minute changes in static pressure will cause movement of diaphragm 34 without substantial friction as would be the case were this movement transmitted through links or levers. Set point screw 62 provides a simple means for adjusting the operating point of the controller by increasing or decreasing the amount of pressure differential required to move diaphragm 34 sufficiently to actuate the control valve.

While the invention has been described and illustrated in its preferred form, it should be understood that the invention is not confined to the precise construction illustrated and that various alterations and modifications are possible within the scope of the invention as described by the appended claims.

What is claimed is:

1. A pneumatic controller for controlling fluid flow in a conduit or the like by varying a control pressure in accordance with a pressure drop in the conduit, the controller comprising, a casing, a pressure-responsive diaphragm dividing the casing into a pair of chambers, a pair of inlet ports in the casing communicating with said chambers respectively and adapted to be communicated in the conduit for rendering said diaphragm movable in response to a pressure drop in the conduit, opposed springs in the casing seated against opposite sides of the diaphragm and biasing the same to a pre-determined control position, a housing connected to the casing, means for varying fluid flow through the conduit including a control chamber in the housing having a supply port and a delivery port, a leak port in the housing communicating with said chamber, a pivoted flapper valve in the housing movable relative to the leak port to control the pressure in said control chamber, an opening in the casing between one of the chambers and said housing, a flexible seal closing said opening, and a valve actuating stem carried by said diaphragm and said flexible seal for actuating said flapper valve in response to movement of said diaphragm as determined by the pressure drop in the conduit.

2. A pneumatic controller as defined in claim 1 including, an adjustable set point screw in the casing engaging one of the springs for selectively adjusting the operating position of the diaphragm.

3. A pneumatic controller as defined in claim 2 further including, a passage in the casing connecting said pair of chambers, and adjustable throttling means in the passage for controlling the rate of flow between the chambers.

4. A pneumatic controller for controlling a variable condition in a flow conduit or the like in response to a static pressure differential between two locations in said conduit comprising, a casing, a diaphragm dividing the casing into a pair of chambers, opposed springs in the casing seated against opposite sides of the diaphragm and biasing the diaphragm to a pre-determined control position between the chambers, a pair of inlet ports respectively communicating with said chambers and adapted to be communicated with the conduit at said two locations, an opening in one wall of the casing, a flexible seal closing the opening, an actuating stem carried by the diaphragm and flexible seal for transmitting movement of the diaphragm to the exterior of the casing, an adjusting screw in the casing engaging one of the springs for adjusting the biasing force on and the position of the diaphragm, a passage in the casing connecting said pair of chambers, and a throttling screw in the passage for controlling the rate of flow between said pair of chambers.

5. A device for controlling a variable condition in a flow conduit or the like in response to a static pressure differential between two locations in said conduit; the device including, a casing, a diaphragm dividing the casing into a pair of chambers, a pair of opposed springs in the casings seated against opposite sides of the diaphragm and biasing the diaphragm to a pre-determined control position between the chambers, a pair of inlet ports respectively communicating with said chambers and adapted to be communicated with said conduit at said two locations, an opening in one wall of the casing, a flexible seal closing the opening, an actuating stem carried by the diaphragm and flexible seal for transmitting movement of the diaphragm to the exterior of the casing, and an adjusting screw in the casing engaging one of the springs for adjusting the biasing force on the diaphragm and consequently the position of the diaphragm between the chambers.

6. A device for controlling flow through a conduit in accordance with a pressure drop in the conduit, the device comprising, a casing, a pressure-responsive member dividing the interior of the casing into a pair of chambers and movable in response to a pressure differential between the chambers, a pair of inlet ports in said casing respectively communicating with said chambers and adapted to be communicated with the conduit for rendering the diaphragm movable in response to a pre-determined drop in the conduit, a pair of opposed springs in the casing seated against opposite sides of the diaphragm and biasing the same to a control position, means defining a control chamber in association with said casing having a supply port adapted for communication with a source of fluid and a delivery port adapted for communication with a device controlling flow through the conduit, means including a bleed valve for controlling the pressure in said control chamber, and a valve actuating stem connected to said pressure-responsive member and extending through said casing for actuating said valve in response to the pressure drop in the conduit.

References Cited by the Examiner
UNITED STATES PATENTS

| | | | |
|---|---|---|---|
| 2,158,068 | 5/1937 | Grove | 251—61 X |
| 2,354,423 | 7/1944 | Rosenberger | 73—205 X |
| 2,661,578 | 12/1953 | Niesemann | 137—484.8 |
| 2,705,046 | 3/1955 | Schroeder | 251—61 X |
| 2,781,770 | 2/1957 | Sutton | 137—85 |
| 2,834,208 | 5/1958 | Westman | 137—85 X |
| 2,938,537 | 5/1960 | Silver | 137—489 |
| 3,021,865 | 2/1962 | Beckett | 137—82 X |
| 3,151,628 | 10/1964 | Heckert | 251—61 |

FOREIGN PATENTS 827,282   2/1960   Great Britain.

WILLIAM F. O'DEA, *Primary Examiner.*

KARL J. ALBRECHT, *Examiner.*